United States Patent [19]
Kazen-Goudarzi et al.

[11] Patent Number: 5,564,007
[45] Date of Patent: Oct. 8, 1996

[54] METHOD FOR CONFIGURING AN AUTOMATED DISPENSE MACHINE

[75] Inventors: Vahid Kazen-Goudarzi, Sunrise; Nandip Kothari, Coral Springs, both of Fla.

[73] Assignee: Motorola Inc., Schaumburg, Ill.

[21] Appl. No.: 253,999

[22] Filed: Jun. 3, 1994

[51] Int. Cl.⁶ ..................................... G06F 9/00
[52] U.S. Cl. ............................. 395/161; 395/155
[58] Field of Search .................... 395/155–161; 345/117–120; 364/489, 491, 468

[56] References Cited

U.S. PATENT DOCUMENTS

| | | | |
|---|---|---|---|
| 4,337,134 | 6/1982 | Norman | 204/198 |
| 4,631,100 | 12/1986 | Pellegrino | 156/150 |
| 4,649,497 | 3/1987 | Carlson et al. | 364/491 |
| 4,665,492 | 5/1987 | Masters | 364/468 |
| 5,031,120 | 7/1991 | Pomerantz et al. | 364/522 |
| 5,045,880 | 9/1991 | Evanitsky et al. | 355/200 |
| 5,079,723 | 1/1992 | Herceg et al. | 395/156 |
| 5,155,692 | 10/1992 | Lewandowski | 364/489 |
| 5,249,263 | 9/1993 | Yanker | 395/131 |
| 5,255,839 | 10/1993 | da Costa Alves et al. | 228/180.21 |

*Primary Examiner*—Raymond J. Bayerl
*Assistant Examiner*—U. Chauhan
*Attorney, Agent, or Firm*—Andrew S. Fuller

[57] ABSTRACT

A method is provided for configuring an automated media dispense machine (115). A graphical display image representing a template for generating a configuration of dispensing parameters for the dispense machine (115) is presented on a display device (151). A graphic manipulation tool (137) is provided for graphically adjusting the display image. The display image is modified using the graphic manipulation tool (137) to configure the dispensing parameters for the dispense machine (115). A configuration of dispensing parameters for the dispense machine (115) is generated based on modifications to the display image.

17 Claims, 5 Drawing Sheets

5,564,007

METHOD FOR CONFIGURING AN AUTOMATED DISPENSE MACHINE

TECHNICAL FIELD

This invention relates generally to machine configuration, and more particularly, to the configuration of automated dispense machines in a manufacturing environment.

BACKGROUND OF THE INVENTION

Many modern automated factories have flexible manufacturing lines capable of producing a variety of products, or variations of a product. Generally, machines on a manufacturing line are configured to perform specific tasks. The ability to quickly change the configuration of these machines is critical for some operations on the factory line. For example, the manufacturing of electronic devices typically involves populating a circuit substrate, such as a printed circuit board, with electronic components. Automated dispense machines are used to dispense flux or other tacking media, to prepare the printed circuit board for the population of circuit components. Other automated machines place the components onto the printed circuit board. Configuration of these automated machines can be tedious and time consuming.

Typically, configuration is accomplished using software and data to program machine control parameters. For media dispense machines, the parameters may include location, volume, and type. Traditionally, these parameters are determined for a particular product by combining product specific data with machine specific data to produce a data file or set of program instructions. These data files or program instructions must be interpreted to facilitate modifications needed to accommodate product changes or to address situation dependent concerns. Depending on the complexity of the product, the machine, and the operations involved in programming the machine, such modifications may require much time and effort.

Flexibility and efficiency are important considerations in the design of a modern factory. The ability to quickly modify the output of a production line is essential in many manufacturing environments. The facilitation of machine configuration is an important aspect of production line management. Prior art machine configuration techniques are inadequate to meet the demanding requirements for quick modification to the output of automated dispense machines. Therefore, it is desirable to have an improved approach to the configuration of automated dispense machines.

DETAILED DESCRIPTION OF THE PREFERRED EMBODIMENT

The present invention provides for a method of configuring automated machines, such as automated media dispense machines, operating on a manufacturing line. The machines are capable of being configured through programming to perform operations on an assembly or sub-assembly. In the preferred embodiment, the machines are used in a factory which produces electronic products. Thus, the machines operate on a circuit substrate, such as a printed circuit board, to populate the circuit board with circuit components. Each machine is programmed to precisely control its operation on the circuit board. The factory may produce a variety of models or products, each with the different characteristics. Preferably, the factory should be able to produce the variety of products without substantial manual intervention for machine configuration. The present invention facilitates configuration operations for automated dispense machines in such a factory.

Figure 1:
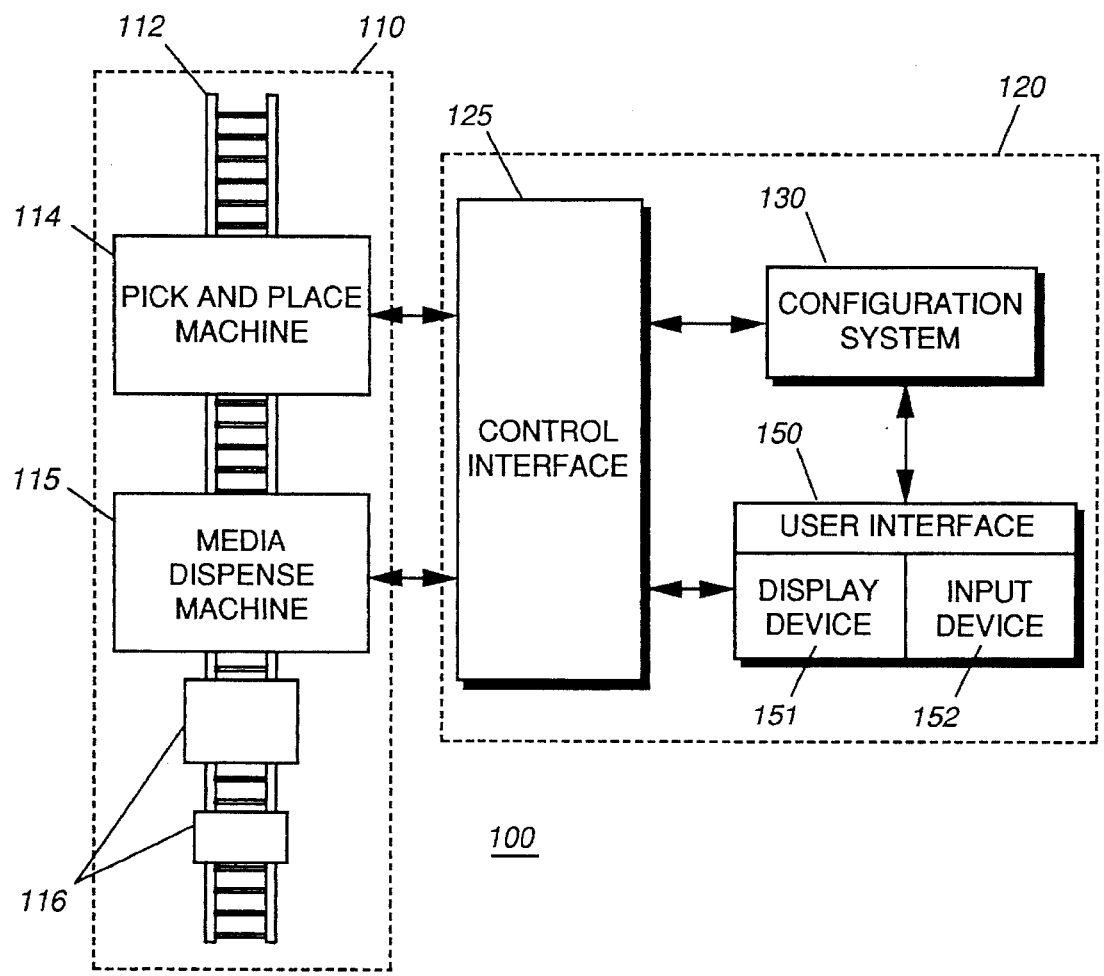
FIG. 1 is a block representation of a portion of a factory, in accordance with the present invention.

Referring now to FIG. 1, a block representation of a portion of a factory 100 is shown, in accordance with the present invention. The factory 100 includes a manufacturing line 110, and its associated control system. In the manufacturing line 110, a conveyor 112 carries product sub-assemblies or modules 116 to various automated machines 114, 115 for processing. The automated machines 114, 115 include a tacking media dispense machine 115, and a pick and place machine 114. The product modules 116 are circuit boards which are to be populated with circuit components using the automated machines 114, 115. First, the conveyor 112 takes each circuit board 116 to the media dispense machine 115 which dispenses glue, paste, flux, or combinations of these on the circuit board 116. Second, each circuit board 116 is carried to the pick and place machine 114 which places electronic components (not shown) on the circuit board 116. The conveyor 112 then takes the product module to other portions of the factory (not shown) for further manufacturing operations. Each automated machine 114, 115 must be properly configured for its operation according to the specifications of the product module 116 which is to be processed.

In the preferred embodiment the manufacturing line 110 processes modules 116 of different dimensions and characteristics. Thus, each machine 114, 115 must have a configuration pertaining to a particular type of module 116. A new configuration may be needed to accommodate changes in product specification, or in response to changes within the manufacturing process. Oftentimes, configuration changes are required while the factory 100 is in operation. Changes must be made expediently, and in a manner that minimizes the likelihood of error to prevent the production of defective products, and to reduce the likelihood of extensive factory downtime. The present invention provides for a novel approach to the configuration of automated dispense machines. In the preferred embodiment, configuration is accomplished using a configuration system 130 operating within a factory control environment 120 which interfaces with the automated machines 114, 115 through a factory control interface 125. An operator accesses the configuration system 130 through a graphically based user interface 150. The user interface 150 includes a display device 151 for displaying graphical images, and an input device 152 which allows manipulation of the graphical images. The input device includes a mouse or pointing device, and keyboard, touch screen, or other data input device.

Figure 2:
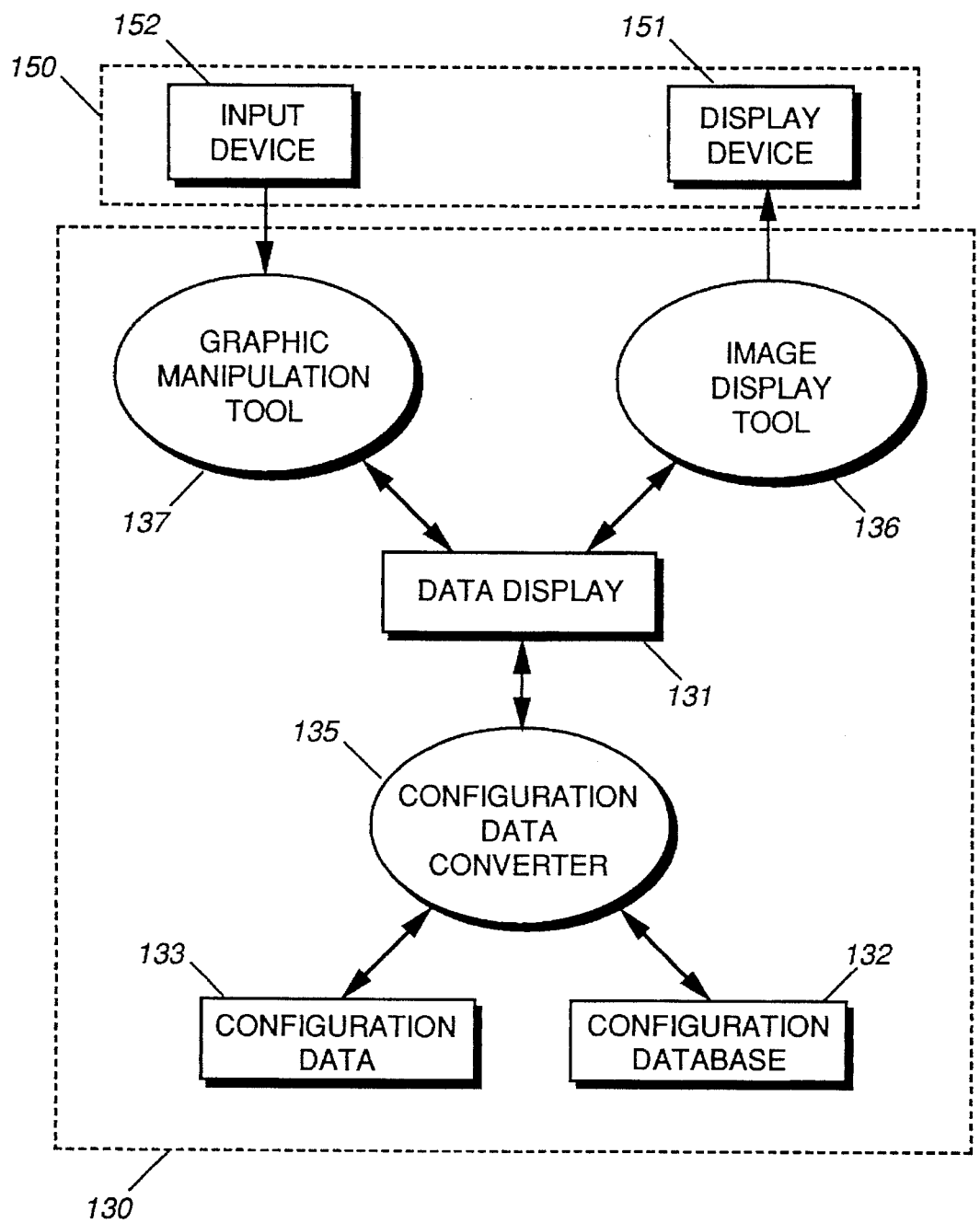
FIG. 2 is a data flow diagram of a configuration system in accordance with the present invention.

Referring now to FIG. 2, a data flow diagram of the configuration system 130 and user interface 150 is shown in accordance with the present invention. The configuration system 130 is implemented on a computing device which includes data storage locations 131, 132, 133, and peripheral input and output devices 150. The configuration system 130 can be separated into logical components including data storage locations for a configuration database 132, a particular instance of configuration data 133, and a display data storage area 131. These data storage locations 131, 132, 133 are operated on by logical processes which include a configuration data converter 135, an image display tool 136, and a graphic manipulation tool 137. The logical processes and components of the configuration system 130 may be implemented using computer hardware, software, or combinations of both. Furthermore, software components may comprise a single program module or combinations of program modules.

The configuration system 130 interfaces with an operator through the user interface 150. The configuration data converter 135 operates to take a particular instance of configuration data 133 from the configuration database 132 and convert it to a format which is directly convertible to an image representation of the configuration data. The particular instance of configuration data 133 includes data and/or instructions for a specific automated dispense machine for operations on a specific product. For example, the instance of configuration data 133 may represent the machine parameters for the media dispense machine 115 which are needed for the machine to operate on a specific type of circuit board 116. The machine parameters may include location, media type, media volume, and other parameters to correctly define the operation which is to be performed by the media dispense machine 115 on the circuit board 116.

Ordinarily, the instance of configuration data 133 is easily converted to the specific data format which is required by the media dispense machine 115, or other like machine. The configuration database 132 may include several such configurations for the various machines and product specification combinations within the factory 100. A factory 100 capable of producing multiple products or several configurations of a product, and which utilizes several automated machines 114, 115 may require a database which is substantial in size. The configuration data converter 135 provides access to the configuration database 132 and functions as a server for data for a particular configuration. The configuration data converter 135 also performs the function of converting the configuration data from the formats stored in the configuration database 132 to display data 131. Display data 131 is a format which can be readily processed into an image representing the configuration. The configuration data converter 135 may be implemented using software instructions within a program or may comprise several programs in combination to provide the functionality described.

The graphic manipulation tool 137 and the image display tool 136 operates on the image data produced by the configuration data converter. The image display tool 136 converts the display data 131 into images for display on the display device 151. The images may comprise graphical representations of the products of assembly and the operations which are to be performed on a module. For example, the image may comprise a representation of a circuit board 116, the parts which are to be placed on the circuit board 116, and tacking medium which is to be used to secure the parts. The graphic manipulation tool 137 allows direct manipulation of the graphical images in response to inputs from an input device 152. Modifications to the images performed through the graphic manipulation tool 137 are stored in the display data storage location 131. In the preferred embodiment, the graphic manipulation tool 137 and image display tool 136 are combined into a single software package.

Figure 3:
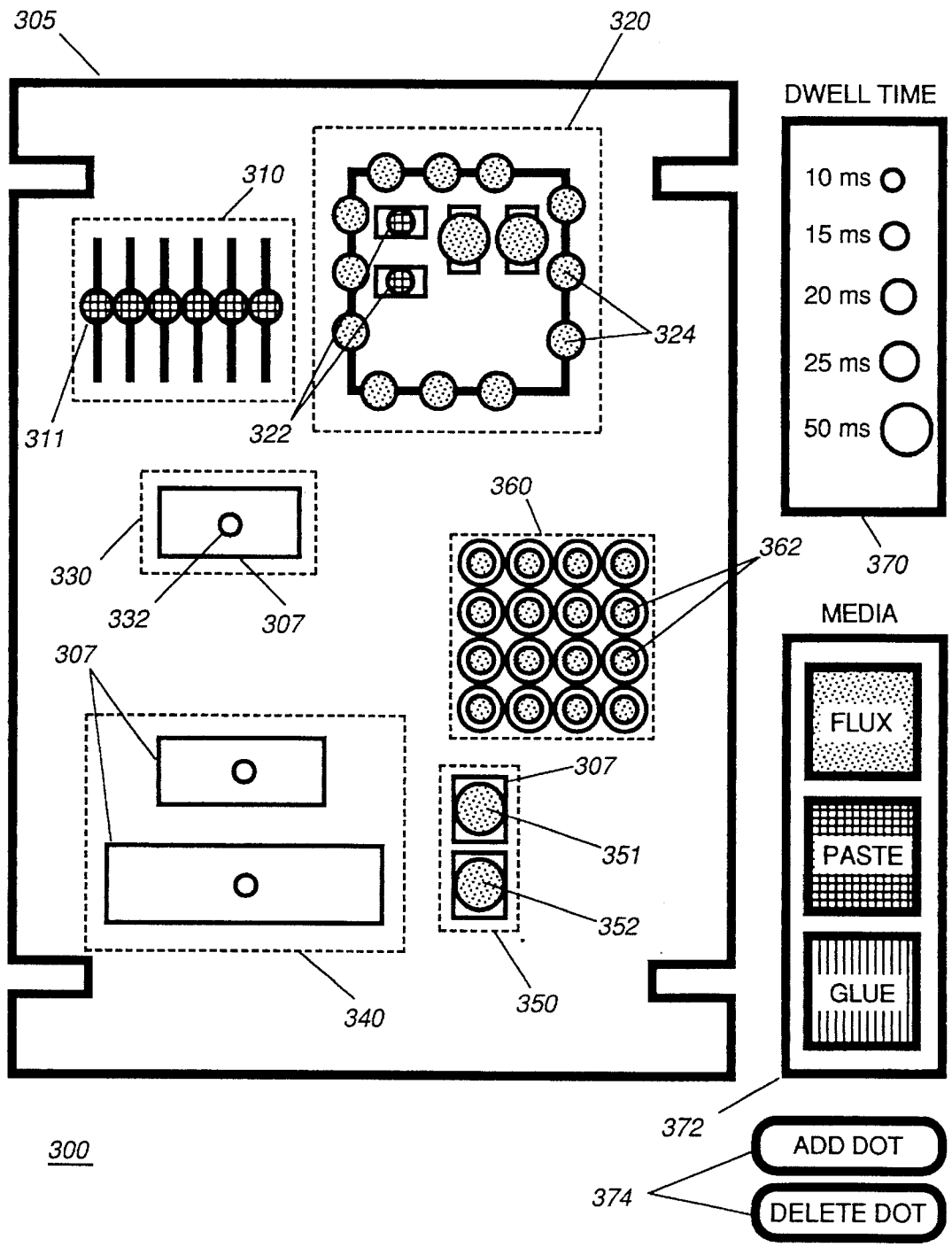
FIG. 3 is a before image corresponding to an old configuration of the media dispense machine, in accordance with the present invention.
Figure 4:
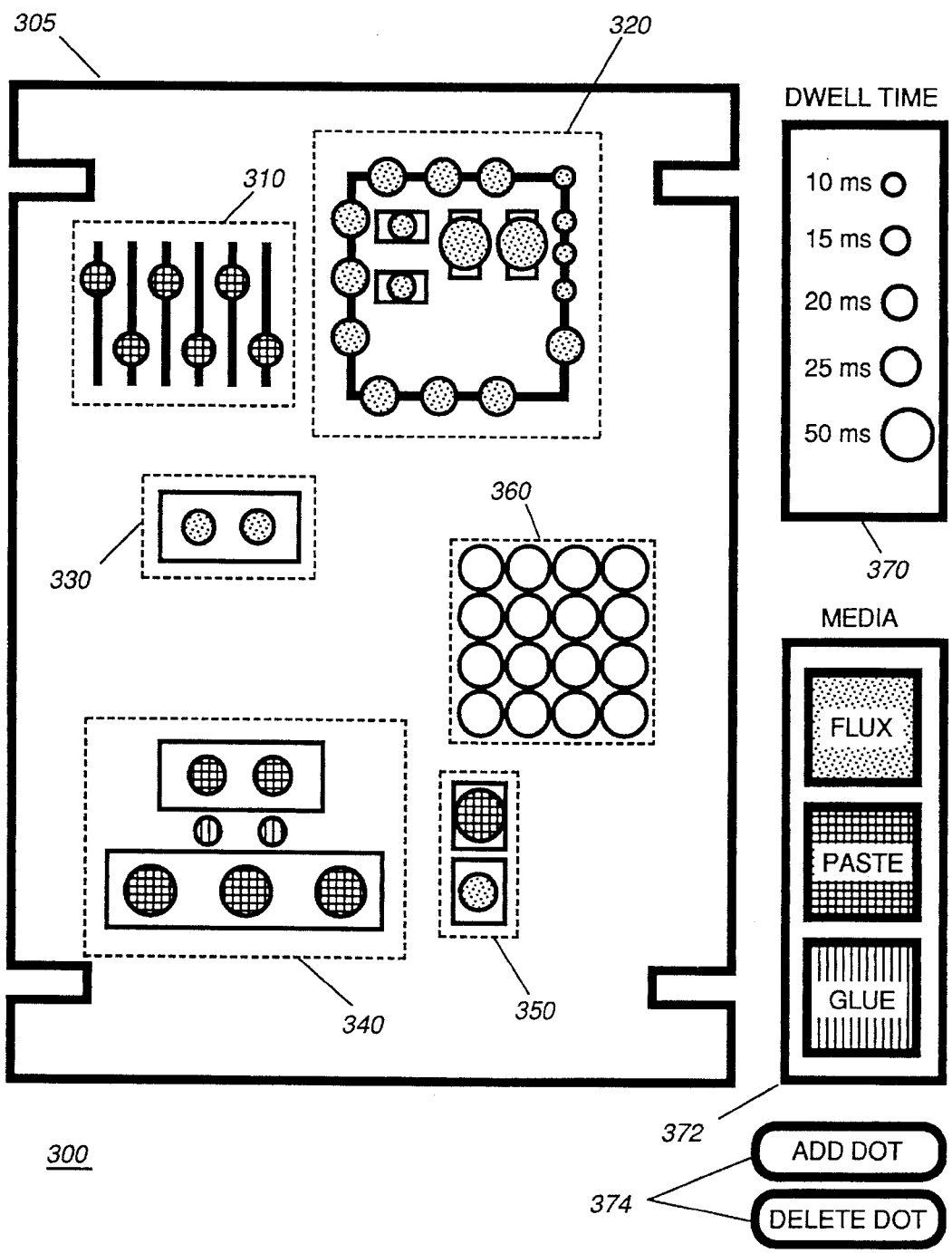
FIG. 4 is an after image corresponding to a new configuration for the media dispense machine, in accordance with the present invention.

FIGS. 3 and 4 represent before and after images corresponding to old and new configurations of the media dispense machine 115, as represented by the combined graphic display and manipulation tool 136, 137 on the display device 151. The images depicted include the outline 305 of a circuit board 116, pad outlines 307, and indicators for the deposition of media. Icons, which have location, shape, size or volume, and media characteristics representing the intended results of the operation of the media dispense machine 115 on the circuit board 116, are employed as indicators. For the purposes of this discussion, it is assumed that configuration represented by FIG. 3 is not satisfactory and modifications are needed to produce a better result after the machine operation. Several modifications are needed. For example, in a first area 310, paste dots 311 must be changed to be staggered; in a second area 320, flux dots 324 should not merge and paste 322 must be replaced with flux; in the third area 330, there is insufficient flux 332 and more flux needs to be added; in a fourth area 340, glue, paste, and more flux are needed; in the fifth area 350, paste is needed on one pad 351, and less flux is needed on another pad 352; and in a sixth area 360, flux dots are not needed. The graphic display and manipulation tool 136, 137 includes dwell time selection panel 370 for selecting the dwell time of a dispensation outlet. The dwell time directly corresponds to the volume and area of the dispensed media. A media type selection panel 372 governs the type of media to be dispensed, which in the preferred embodiment, includes flux, paste and glue. Buttons 374 allow the addition and deletion of specific instances of dispensation. Using these features of the graphic display and manipulation tool, a factory operator may graphically rearrange and reshape icons on the display device 151 shown in FIG. 3 to arrive at the new configuration shown in FIG. 4. Icons are moved, deleted, added to change or adjust media dispense positions. Patterns or colors represent different types of media. Using a mouse or other pointing device (now shown), the operator may drag an icon to a new location, select an icon for deletion or addition, or other manipulation of the image until satisfied with the new configuration. The new configuration reflects changes to the first, second, third, fourth, fifth, and sixth areas 310, 320, 330, 340, 350, 360.

When the modifications to produce the new configuration are confirmed, the new image will be stored in the display data storage area 131. The configuration data converter 135 then converts the display data 131 into an updated instance of the configuration data. Next, the configuration database 132 is updated with the new instance of configuration data 133. The new configuration is then available to be loaded into the media dispense machine 115. Other automated dispense machines will have different represented images and different options for their manipulation. However, the concepts described with respect to the media dispense machine 115 are readily extendible to other automated dispense machines.

Figure 5:
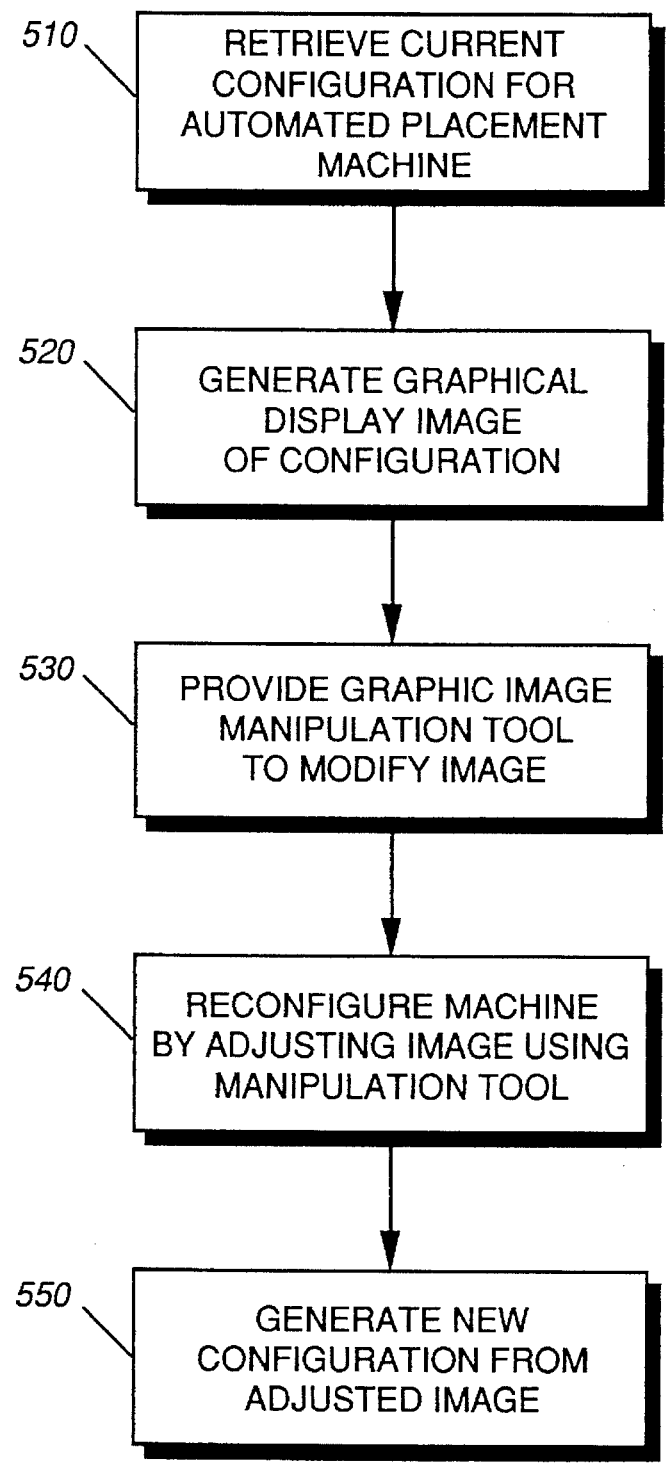
FIG. 5 is a summary of procedures used for configuring the automated dispense machine, in accordance with the present invention.

Referring now to FIG. 5, the steps needed for configuring the automated dispense machine are summarized. The current configuration of dispense parameters for the automated dispense machine is retrieved, step 510. This configuration may be stored in a database or retrieved directly from the machine. The graphical display image representing the configuration of the machine is generated and presented on a display device to form a template for generating a new configuration, step 520. When there is no current configuration for the automated dispense machine, a new configuration may be created using a blank template, or a template which contains the outline of a circuit board or other platform, in addition to other information. A graphic manipulation tool is provided for graphically adjusting the display image so as to generate a new configuration for the machine, step 530. Using the graphic manipulation tool, the display image is modified to reconfigure the dispense parameters for the automated dispense machine, step 540. Once graphically reconfigured, a new configuration of dispense parameters is generated for the automated dispense machine based on the modifications to the display image, step 550. In the preferred embodiment, the new configuration is either stored in the configuration database or downloaded to the automated dispense machine.

The present invention offers significant advantages over the prior art. Traditionally, modifications to the configuration of an automated dispense machine was generated and stored in the machine without a readily accessible preview of what configuration represents within the machine. The present invention allows an operator to configure the automated dispense machine and to see the effect of configuration changes immediately on a display device. After configuration changes have been made to the satisfaction of the operator, the changes represented by the display image are extracted and transformed into a machine related format. Thus, the present invention provides for an immediate feedback with regard to configuration changes made. Prior art configuration processes required the operator to be familiar with machine readable information such as data and program instructions. Using the present invention, the operator need not be experienced with the internal operations of the machine being configured, and need not be intimately familiar with the operation of the dispense process. Consequently, the configuration process is facilitated. A reduction in the time required to implement new configurations can be critical in many manufacturing environments. Oftentimes, configuration changes are needed to address variations in components delivered to the manufacturing floor, to correct for process variations, etc. The present invention allows for improvements in response time to such manufacturing issues.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for configuring an automated media dispense machine, comprising the steps of:
    presenting a graphical display image on a display device, the graphical display image representing a first configuration of parameters for circuit board processing media dispensed from the dispense machine to an electronic circuit board;
    providing a graphic manipulation tool for graphically adjusting the display image;
    modifying the display image using the graphic manipulation tool to reconfigure the first configuration of dispensing parameters for the dispense machine; and
    generating a second configuration of dispensing parameters for the dispense machine based on modifications to the display image.

2. The method of claim 1, wherein the step of presenting a graphical display image representing a first configuration of dispensing parameters for the dispense machine on a display device, comprises the steps of:
    retrieving from a database, first data representing the first configuration of dispensing parameters for the dispense machine; and
    converting the first data into graphical images.

3. The method of claim 1, wherein the step of presenting a graphical display image representing a first configuration of dispensing parameters for the dispense machine on a display device, comprises the step of retrieving the first configuration of dispensing parameters from the dispense machine.

4. The method of claim 1, wherein the step of providing a graphic manipulation tool for graphically adjusting the display image, comprises the step of providing a dwell time selection panel for selecting a dwell time for a dispensation outlet.

5. The method of claim 1, wherein the step of providing a graphic manipulation tool for graphically adjusting the display image, comprises the step of providing a media type selection panel for selecting a type of media to be dispensed.

6. The method of claim 1, wherein the step of presenting a graphical display image representing a first configuration of dispensing parameters for the dispense machine on a display device, comprises the step of employing icons to represent location, size, and type of media to be dispensed.

7. The method of claim 6, wherein the step of modifying the display image using the graphic manipulation tool to reconfigure the first configuration of dispensing parameters for the dispense machine, comprises the step of graphically rearranging the icons on the display device to relocate media dispense locations.

8. The method of claim 1, wherein the step of presenting comprises the step of representing a first configuration of parameters for dispensing tacking medium.

9. The method of claim 1, wherein the step of presenting comprises the step of representing a first configuration of parameters for dispensing flux medium.

10. In a configuration system for an automated dispense machine, the configuration system including a computing device having a user interface, the user interface having a display device and an input device, a method for configuring the automated dispense machine, comprising the steps of:
    retrieving a first configuration of dispensing parameters for the automated dispense machine, the first configuration of dispensing parameters representing current tacking media dispense parameters on an electronic circuit board; p1 presenting a graphical display image including icons to represent the first configuration;
    providing a graphic manipulation tool for graphically adjusting the display image;
    modifying the display image using the graphic manipulation tool to reconfigure the first configuration of dispensing parameters for the dispense machine; and
    generating a second configuration of dispensing parameters for the dispense machine based on modifications to the display image.

11. The method of claim 10, wherein the step of providing a graphic manipulation tool for graphically adjusting the display image, comprises the step of:
    providing a dwell time selection panel for selecting a dwell time of a dispensation outlet; and
    providing a media type selection panel for selecting a type of media to be dispensed.

12. The method of claim 10, wherein the step of presenting a graphical display image including icons to represent the first configuration, comprises the step of employing icons to represent location, size, and media type.

13. The method of claim 10, wherein the step of modifying the display image using the graphic manipulation tool to reconfigure the first configuration of dispensing parameters for the dispense machine, comprises the step of graphically rearranging the icons on the display device to relocate media dispense locations.

14. A method for generating a configuration for an automated dispense machine using a computing device having a user interface, the method comprising the steps of:

presenting, on a display device, a graphical display image of a template, having an outline of a circuit board, for generating a configuration of dispensing parameters for the automated dispense machine;

providing a graphic manipulation tool for graphically adjusting the display image;

modifying the display image using the graphic manipulation tool to configure the template to specify dispensing parameters for the automated dispense machine; and generating a configuration of dispensing parameters for the automated dispense machine based on modifications to the display image.

15. The method of claim 14, wherein the step of presenting, on a display device, a graphical display image of a template for generating a configuration of dispensing parameters for the dispense machine, comprises the step of providing a template based on a first configuration of the automated dispense machine.

16. The method of claim 14, wherein the step of presenting comprises the step of representing a first configuration of parameters for dispensing tacking medium.

17. The method of claim 14, wherein the step of presenting comprises the step of representing a first configuration of parameters for dispensing flux medium.

* * * * *